Patented Jan. 19, 1937

2,067,919

UNITED STATES PATENT OFFICE 2,067,919

COMPOSITIONS OF MATTER, AND METHODS AND STEPS OF MAKING AND USING THE SAME

Mortimer T. Harvey, East Orange, and Frederick M. Damitz, Ocean Grove, N. J., assignors, by direct and mesne assignments, to The Harvel Corporation, a corporation of New Jersey No Drawing. Application June 20, 1935, Serial No. 27,538

16 Claims. (Cl. 260—2)

The present invention relates to the polymerization of cashew nut shell liquid by means of chemicals to obtain products of several kinds which range in consistency from the liquid state to a rubber-like state. And the present invention also relates to steps in the polymerization process and to the products of the polymerization.

An illustrative example of a chemical suitable for polymerizing cashew nut shell liquid in the manner of the present invention is sulphuric acid. This acid has been used before for polymerizing cashew nut shell liquid as set forth in Harvey Patent No. 1,725,792 and on the invention disclosed in said patent the present invention is a further development and improvement because it uses much less polymerizing agent and gives a product having a greater range of consistency.

It is an object of the present invention to thicken or body cashew nut shell liquid by the methods and steps of the present invention to prepare it for various and different purposes and uses. Illustrative examples are given below to show some of the ways in which the present invention can be utilized.

There is another important object and advantage in the method of the present invention and that is to reduce the itch causing property or "poison ivy" effect which raw cashew nut shell liquid has and at the same time leave the treated cashew nut shell liquid in the desired condition for use whether as a raw material such as in the liquid state for making varnishes for example or as a rubber-like material for example or in any other state. The methods of the present invention give a raw material which is either partly or entirely free of the poison ivy effect and is useful in the making of cashew nut shell liquid products which definitely do not have this effect.

Our copending applications Serial Numbers 620,551 and 714,448 describe the methods of polymerizing cashew nut shell liquid and at the same time reducing the "poison ivy" effect and the present invention adds an improvement to the manner in which the chemicals used for these purposes are added. In this respect the present invention is a continuation of the above identified copending applications which latter describe the mixing of the cashew nut shell liquid and the chemicals used for the polymerizing and itch reducing treatment by forming an emulsion with the aid of water. An improvement added in the present application is in the use of a solvent which will dissolve both the cashew nut shell liquid and the polymerizing chemical used for the treatment, or one which will dissolve the polymerizing chemical and in turn itself be dissolved by the cashew nut shell liquid, and thereby carry the polymerizing chemical quickly in even distribution through the whole of the cashew nut shell liquid to be treated.

During the polymerizing of cashew nut shell liquid according to the methods of the present invention hydrogen sulphide is liberated and driven off and salts of the polymerizing chemical are precipitated. These salts include, among others, the sodium, potassium, calcium, magnesium, iron and lead salts. Usually these precipitated salts are separated from the polymerized cashew nut shell liquid. This separation is usually done while the polymerized cashew nut shell liquid is in the fluid state and they generally collect at the bottom of the vessel in which the polymerizing reaction is carried on. After the separation of the salts the polymerized cashew nut shell liquid can be further polymerized by continuation of heating with the polymerizing chemical already mixed with it or by the use of additional polymerizing chemical to a desired thickness. Also the salt free polymerized cashew nut shell liquid can be given other treatments as hereinafter indicated for making the various products for which cashew nut shell liquid is suitable. These salts have been found to be present in amounts equivalent to one-quarter to one and one-half of one per cent of the weight of the cashew nut shell liquid in the sulphate salts such as are precipitated when sulphuric acid is used as the polymerizing chemical. The metallic elements of these salts apparently come from the cashew nut shell and the amounts present in the cashew nut shell liquid depend on the method in which the cashew nut shell liquid is removed from the shell.

The following are given as examples of the methods and products of the present invention.

The lower limit of the proportion of the polymerizing chemical in the case of sulphuric acid is about one part by volume of concentrated sulphuric acid to one hundred parts by volume of cashew nut shell liquid. The upper limit is about six parts by volume of concentrated sulphuric acid to one hundred parts by volume of cashew nut shell liquid.

When a material other than concentrated sulphuric acid is used as the polymerizing chemical the proportions are equivalent to those given for concentrated sulphuric acid to produce the corresponding results, illustrative examples being given. Examples of other materials suitable for use as polymerizing chemicals for cashew nut shell liquid for the purposes of the present invention are zinc chloride, stannic chloride, aluminum chloride, phosphorous oxychloride, phosphoric acid, hydrochloric acid, and any mixtures of these or any mixture of one or more of them with sulphuric acid. In the use of the polymerizing chemicals named above, some are used alone and others are used with a solvent or with an emulsifying vehicle for obtaining an even distribution of the polymerizing chemical throughout the cashew nut shell liquid and thereby to obtain uniform polymerizing action. This is determined by the rate at which polymerizing reaction takes place in each particular case, for example, the polymerizing action of concentrated sulphuric acid is so rapid that a quick and uniform distribution of the sulphuric acid is necessary to obtain uniform reaction in the desired proportions. On the other hand, in the case of phosphorous oxychloride the reaction is of such nature that that material can be added slowly with stirring and still get a uniform reaction.

*Example A.*—About 100 parts by weight of raw cashew nut shell liquid and a solution of 5.4 parts of concentrated sulphuric acid in about 15 parts of water are emulsified and heated to about 300° F. to 375° F. for about 30 to 45 minutes to produce a body of a consistency which may vary from a very heavy cold molasses to a ropy sticky mass. The temperature and time of heating are regulated to suit the size of batch and to take into consideration the fact that an exothermic reaction takes place. The temperature may run from 300° to 350° F. or more after application of heat is discontinued, the ultimate use of the material and method of application thereof being used as a guide in the temperature control. The product resulting from the method of Example A is suitable for making electrical insulation, for gasket material, for water proofing and other uses and can be used in making varnishes, coatings, impregnations, and molded composition and for mixing the rubber for general use. The material of Example A is suitable for application to metal, wood, paper, cloth and other materials. Gasket material can be made by application to asbestos, lamp wicking or fabric sheets or webbing, the material, after the application, being set at a temperature of about 260° to 285° F. for a period of about 8 to 15 hours to produce a resilient rubbery consistency. This product is insoluble in lubricating oils and greases and is impervious to water, has good electrical insulating properties, long life and other desirable characteristics.

*Example B.*—The material of Example A is suitable for mixture with rubber to increase its imperviousness to oils and water and moisture and to increase its dielectric property. In such use the material of Example A can be heated at about 260 to 285° F., for example, for about 8 to 15 hours to produce a resilient rubber-like mass which can be comminuted and intermixed with rubber in amounts ranging from about 5% or less to 80% or more of the mixture depending on the characteristics desired in the finished product. This resilient rubber-like product which is mixed with the rubber is more impervious to water and moisture and oil than is rubber and imparts these characteristics to the rubber mixture. Another important advantage is that this resilient rubbery product has unusual ageing qualities and that it imparts this quality to a rubber mixture made therewith to give a much greater life than in the rubber itself.

*Example C.*—For another material for modifying rubber, and other materials, and as a substitute for rubber the following is given: 100 parts by volume of raw commercial cashew nut shell liquid and about 2½ parts of concentrated sulphuric acid are emulsified with 15 parts of water and heated to 325° to 375° F. after which about 4% of sulphur by volume of the cashew nut shell liquid are worked in at about 300° to 350° F. or upward. The composition in this condition is ready for working into a rubber mixture batch in most any proportion and can be used itself alone as a rubber substitute and vulcanized. The percentages given are given only as examples and variations may be made within the limitations for sulphuric acid given above, the percentage of sulphur can be varied greatly to give soft or hard products as desired or required and the temperature varied to suit.

In Examples B and C the term rubber is intended not only to cover rubber alone but also the rubber mixtures well known in the art in which are incorporated such materials as asphalts, pitches, waxes, resins, gums, stearates and so on and also the usual inorganic fillers and modifiers well known in the art and also the known vulcanizers, accelerators and so on.

*Example D.*—To about four hundred parts by weight of raw cashew nut shell liquid are added about twenty-four parts of hydrochloric acid (standard muriatic acid, 20° Baumé), one part of concentrated sulphuric acid and fifteen parts of water and the mixture emulsified by stirring vigorously for about one-half hour after which the emulsion is heated under a reflux condenser at about 110° C. for about two and one-half hours. The emulsion is then heated in an open kettle to about 200° C. and, after cooling, is centrifuged to remove any precipitated salts or other undesired materials. The cashew nut shell liquid thus treated is ready for use for making varnishes, paints, electrical insulation or any other product for which cashew nut shell liquid is used including further polymerization with the methods of the present invention.

*Example E.*—About four hundred parts by weight of raw cashew nut shell liquid, eighty parts of isopropyl alcohol and nine parts of concentrated sulphuric acid are heated under a reflux condenser at about 100° C. for about four hours, after which the isopropyl alcohol is distilled off, the ends of the alcohol being blown off with a current of air with the temperature of the treated cashew nut shell liquid at about 160° C. The treated cashew nut shell liquid is then centrifuged or put through a filter press to separate out any salts precipitated after which it is tanked for use for any purpose for which cashew nut shell liquid is suitable.

*Example F.*—For making a rubber-like product such as disclosed in Examples A, B, and C the treated material of Example E is emulsified with a solution of about one percent of its weight of concentrated sulphuric acid in about three per cent of its weight of water at room temperature by mechanical stirring after which the emulsion is heated to about 325° F. to 350° F. and poured into shallow pans in which it is heated at about 260° F. to 285° F. for about eight to sixteen hours to produce the rubber-like material suitable for general use and for the uses set forth in Examples A, B, and C and elsewhere herein.

The material of Example D can be made into the rubber-like material by the steps of Example F.

The materials of the present invention which are of comparatively low viscosity, such for example as the materials of Examples A, D, and E, can be used for making varnishes, paints, impregnating materials, electrical insulation and other products by the general and particular methods set forth in the Patents 1,725,791 to 1,725,797; 1,771,785; 1,771,786; 1,819,416; 1,821,095; 1,838,070 to 1,838,077 of Harvey and others and in other United States patents on cashew nut shell liquid products to which reference is hereby made, to get products which are free of the vesicant characteristic of raw cashew nut shell liquid. This material of Examples A, D, and E is a non-drying liquid and will stand in bulk without changing in viscosity and without changing its characteristics of reaction with driers such as manganese resinate or condensing material such as formaldehyde.

As examples of equivalents of concentrated sulphuric acid in the amounts used as hereinabove set forth the following are given. One to ten per cent by volume of phosphorous oxychloride to raw cashew nut shell liquid can be used in the methods of the examples above given. Also one to ten per cent by weight of zinc chloride to raw cashew nut shell liquid can be used by the same methods. Water, alcohol or other solvent can be used where suitable for distributing the polymerizing chemical throughout the cashew nut shell liquid, and solvents can be used for washing the polymerizing chemical out when the desired degree of polymerization is reached and the viscosity of the treated cashew nut shell liquid permits. When a strong polymerizing chemical such as sulphuric acid is used it should be mixed with the solvent before adding to the cashew nut shell liquid to avoid local and uneven polymerization. In the case where the polymerizing chemical produces soluble salts from the cashew nut shell liquid, these salts can be washed out with water.

Having thus described our invention, what we claim and desire to protect by Letters Patent is:

1. A process comprising reacting cashew nut shell liquid and from about 1% to about 5% of its volume in concentrated sulphuric acid.

2. A process of reacting cashew nut shell liquid and sulphuric acid, the latter in amount about 1% to 5% of concentrated sulphuric acid by volume of the cashew nut shell liquid, to produce a rubber like product.

3. A rubber-like product obtained by reacting cashew nut shell liquid and sulphuric acid, the latter in amount about 1% to 5% of concentrated sulphuric acid by volume of the cashew nut shell liquid.

4. A rubber-like resilient product which is a heat reaction product of cashew nut shell liquid and sulphuric acid, the latter being used in amount equivalent to from about 1% to about 5% of the volume of the cashew nut shell liquid.

5. A process comprising reacting cashew nut shell liquid and from about 1% to about 6% of its volume in concentrated sulphuric acid.

6. A process of polymerizing cashew nut shell liquid which comprises heating cashew nut shell liquid with sulphuric acid, the latter being used in amount equivalent to from about 1% to about 6% of the volume of the cashew nut shell liquid.

7. A process of polymerizing cashew nut shell liquid which comprises heating cashew nut shell liquid with sulphuric acid, the latter being used in amount equivalent to from about 1% to about 6% of the volume of the cashew nut shell liquid, and removing any salts precipitated.

8. A process of polymerizing cashew nut shell liquid which comprises heating cashew nut shell liquid with a solution of sulphuric acid, the latter being used in amount equivalent to from about 1% to about 6% of the volume of the cashew nut shell liquid.

9. A process of polymerizing cashew nut shell liquid which comprises heating cashew nut shell liquid with a solution of sulphuric acid, the latter being used in amount equivalent to from about 1% to about 6% of the volume of the cashew nut shell liquid and the solvent for the sulphuric acid being miscible with the cashew nut shell liquid.

10. Polymerized cashew nut shell liquid obtained by reacting cashew nut shell liquid and from about 1% to about 6% of its volume in concentrated sulphuric acid.

11. A process of polymerizing cashew nut shell liquid which comprises intermixing cashew nut shell liquid with a solution of sulphuric acid in isopropyl alcohol and heating to bring about the polymerizing reaction, the sulphuric acid being used in amount equivalent to from about 1% to about 6% by volume of the cashew nut shell liquid.

12. The process which comprises polymerizing cashew nut shell liquid with an agent which precipitates metal elements from the cashew nut shell liquid and separating the precipitates from the polymerized cashew nut shell liquid.

13. The process which comprises polymerizing cashew nut shell liquid with an agent which precipitates metal elements from the cashew nut shell liquid separating the precipitates from the cashew nut shell liquid, and further polymerizing the cashew nut shell liquid.

14. As an article of manufacture, a liquid which is cashew nut shell liquid which has been polymerized by treatment with up to about 6% of concentrated sulphuric acid by volume of the cashew nut shell liquid and which in a bulk mass remains at a substantially constant viscosity at a given normal temperature.

15. A process of treating cashew nut shell liquid so as to reduce its vesicant properties which comprises subjecting by intimate mixture of a body of raw cashew nut shell liquid to about 1% to 10% of an agent which has the property of polymerizing said cashew nut shell liquid and of reducing the vesicant effect of the raw liquid.

16. The method which comprises disseminating sulphuric acid in a dilute condition into cashew nut shell liquid, the former in amount up to about 6% of the volume of the cashew nut shell liquid calculated for concentrated sulphuric acid, and heating to remove the diluent and to promote polymerization of the cashew nut shell liquid.

MORTIMER T. HARVEY.
FREDERICK M. DAMITZ.